(12) United States Patent
Yoshizawa et al.

(10) Patent No.: US 12,233,472 B2
(45) Date of Patent: Feb. 25, 2025

(54) SPOT WELDING METHOD FOR ALUMINUM MATERIAL AND ALUMINUM MATERIAL

(71) Applicant: Kabushiki Kaisha Kobe Seiko Sho (Kobe Steel, Ltd.), Kobe (JP)

(72) Inventors: Mai Yoshizawa, Kanagawa (JP); Tetsu Iwase, Kanagawa (JP)

(73) Assignee: Kabushiki Kaisha Kobe Seiko Sho (Kobe Steel, Ltd.), Kobe (JP)

(*) Notice: Subject to any disclaimer, the term of this patent is extended or adjusted under 35 U.S.C. 154(b) by 779 days.

(21) Appl. No.: 17/435,754

(22) PCT Filed: Mar. 19, 2020

(86) PCT No.: PCT/JP2020/012522
§ 371 (c)(1),
(2) Date: Sep. 2, 2021

(87) PCT Pub. No.: WO2020/203375
PCT Pub. Date: Oct. 8, 2020

(65) Prior Publication Data
US 2022/0152726 A1 May 19, 2022

(30) Foreign Application Priority Data

Mar. 29, 2019 (JP) ................................. 2019-068388
Feb. 19, 2020 (JP) ................................. 2020-026162

(51) Int. Cl.
*B23K 11/11* (2006.01)
*B23K 11/18* (2006.01)
(Continued)

(52) U.S. Cl.
CPC .......... *B23K 11/115* (2013.01); *B23K 11/185* (2013.01); *B23K 11/3009* (2013.01); *B23K 11/36* (2013.01); *B23K 2103/10* (2018.08)

(58) Field of Classification Search
CPC ..... B23K 11/115; B23K 11/185; B23K 11/34; B23K 11/36; B23K 11/3018; B23K 11/3009; B23K 2103/10
See application file for complete search history.

(56) References Cited

U.S. PATENT DOCUMENTS

| 4,591,687 | A |   | 5/1986 | Urech |   |
|---|---|---|---|---|---|
| 5,783,794 | A | * | 7/1998 | Oikawa | ................. B23K 11/115 219/94 |
| 2008/0070102 | A1 | * | 3/2008 | Watanabe | ......... H01M 10/4207 429/91 |

FOREIGN PATENT DOCUMENTS

| GB | 2 068 814 A | 8/1981 |
|---|---|---|
| JP | 5-383 A | 1/1993 |

(Continued)

OTHER PUBLICATIONS

International Search Report issued Jun. 9, 2020 in PCT/JP2020/012522 (with English translation), 5 pages.
(Continued)

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

This spot welding method for an aluminum material comprises: a processing step in which, in a plan view, a circular emboss expanded in a direction of superposition on a second aluminum plate side is formed at a position-to-be-welded of a first aluminum plate; an arrangement step in which positions-to-be-welded are superimposed while the expansion side of the emboss faces the second aluminum plate, and the positions-to-be-welded are arranged between a pair of electrodes; a pressing step in which the superimposed aluminum plates are pinched between the electrodes, and a central side excluding a peripheral edge of the emboss is pressed; and an
(Continued)

electrification step of performing pressing and electrification. An electrode having a tip diameter larger than the diameter of a root part of the expansion part of the emboss is used.

13 Claims, 14 Drawing Sheets

(51) Int. Cl.
  *B23K 11/30* (2006.01)
  *B23K 11/36* (2006.01)
  B23K 103/10 (2006.01)

(56) References Cited

FOREIGN PATENT DOCUMENTS

| | | | |
|---|---|---|---|
| JP | 05285669 A | * | 11/1993 |
| JP | 6-170549 A | | 6/1994 |
| JP | 3862640 B2 | | 12/2006 |
| JP | 2014-57978 A | | 4/2014 |
| JP | 2015-39713 A | | 3/2015 |
| JP | 2017225990 A | * | 12/2017 |

OTHER PUBLICATIONS

Written Opinion of the International Searching Authority issued Jun. 9, 2020 in PCT/JP2020/012522 (with English translation), 12 pages.

* cited by examiner

SPOT WELDING METHOD FOR ALUMINUM MATERIAL AND ALUMINUM MATERIAL

TECHNICAL FIELD

The present invention relates to a spot welding method for an aluminum material, and an aluminum material.

BACKGROUND ART

As a method of spot-welding superimposed aluminum materials by a pair of electrodes, there is a method of applying a first pressurizing force between the electrodes, performing main energization for welding, applying a second pressurizing force and electrifying a post-heating current (for example, refer to Patent Literature 1). Also, there is a method of, when spot-welding aluminum plates, electrifying a temper current of 30% to 50% of a welding current for 2 cycles to 5 cycles without releasing a high pressure after forming a nugget (for example, refer to Patent Literature 2).

In addition, a weld bond method is considered in which a spot welding or a resistance welding is performed in combination with an adhesive when bonding structures of a vehicle such as an automobile. Regarding the weld bond method, known is a technology of providing a bonding member with a protrusion to remove an adhesive on a welded part, thereby suppressing an influence of the adhesive on the welding (for example, refer to Patent Literatures 3 and 4).

CITATION LIST

Patent Literature

Patent Literature 1: Japanese Patent No. 3,862,640
Patent Literature 2: JP-A-H05-383
Patent Literature 3: JP-A-2014-57978
Patent Literature 4: JP-A-H05-285669

SUMMARY OF INVENTION

Technical Problem

In the meantime, the joint strength at the welded part where aluminum materials are superimposed and spot-welded is affected by a diameter and a shape of a nugget formed by the welding. For this reason, when performing the sport welding, it is required to form the nugget formed by the welding into stable dimension and shape.

However, according to the technology disclosed in Patent Literatures 1 and 2, when the diameter of the nugget is increased, a thickness of the nugget is also increased. Therefore, depending on welding conditions, the nugget may grow to such a dimension that the nugget contacts an end of an electrode, thereby lowering the joint strength at the welded part. Also, when the thickness of the nugget is increased and the molten aluminum is attached to the end of the electrode, an intermetallic compound is formed on a surface of the electrode, so that a shape of the end of the electrode changes. In this case, it is necessary to dress and trim the electrode whose shape of the end has changed. However, the frequency of dressing increases, which delays the welding work to lower the productivity.

Also, when the welding is performed in combination with the adhesive, as disclosed in Patent Literatures 3 and 4, even though the protrusion is formed to remove the adhesive from the welded part, the roundness of the nugget is lowered, and particularly, the joint strength in a plane direction may vary.

It is therefore an object of the present invention to provide a spot welding method for an aluminum material capable of stably forming a nugget having target diameter and roundness and performing high-quality welding with high joint strength, and an aluminum material.

Solution to Problem

The present invention has following configurations.

(1) A spot welding method for an aluminum material for superimposing and spot-welding a plurality of aluminum materials, the spot welding method including:
a working process of forming, in a welding-intended position of at least one aluminum material, an emboss having a circular shape in plan view and bulging in a direction of superimposition on other aluminum material-side;
an arrangement process of placing the bulging side of the emboss of the one aluminum material toward another aluminum material, superimposing welding-intended positions of the aluminum materials, and arranging the welding-intended positions between a pair of electrodes;
a pressurizing process of pinching and pressurizing the superimposed aluminum materials with the electrodes to push-in a central side of the emboss excluding a peripheral edge portion of the emboss; and
an energizing process of performing energization between the electrodes while causing the electrodes to continuously perform the pressurizing,
wherein, as the electrodes, electrodes each having a tip diameter larger than a diameter of a root side of the bulging part of the emboss are used.

(2) An aluminum material having an emboss formed at a spot-welded part and satisfying a relation of $Hs > Ht \geq Hb$, where $Hs$ is Vickers hardness of a peripheral edge portion of the emboss, $Ht$ is Vickers hardness of an apex portion of the emboss, and $Hb$ is Vickers hardness of a base metal.

Advantageous Effects of Invention

According to the present invention, it is possible to stably form a nugget having target diameter and roundness and to perform high-quality welding with high joint strength.

DESCRIPTION OF EMBODIMENTS

Hereinafter, embodiments of the present invention will be described in detail with reference to the drawings.

<Spot Welding Machine>

Figure 1:
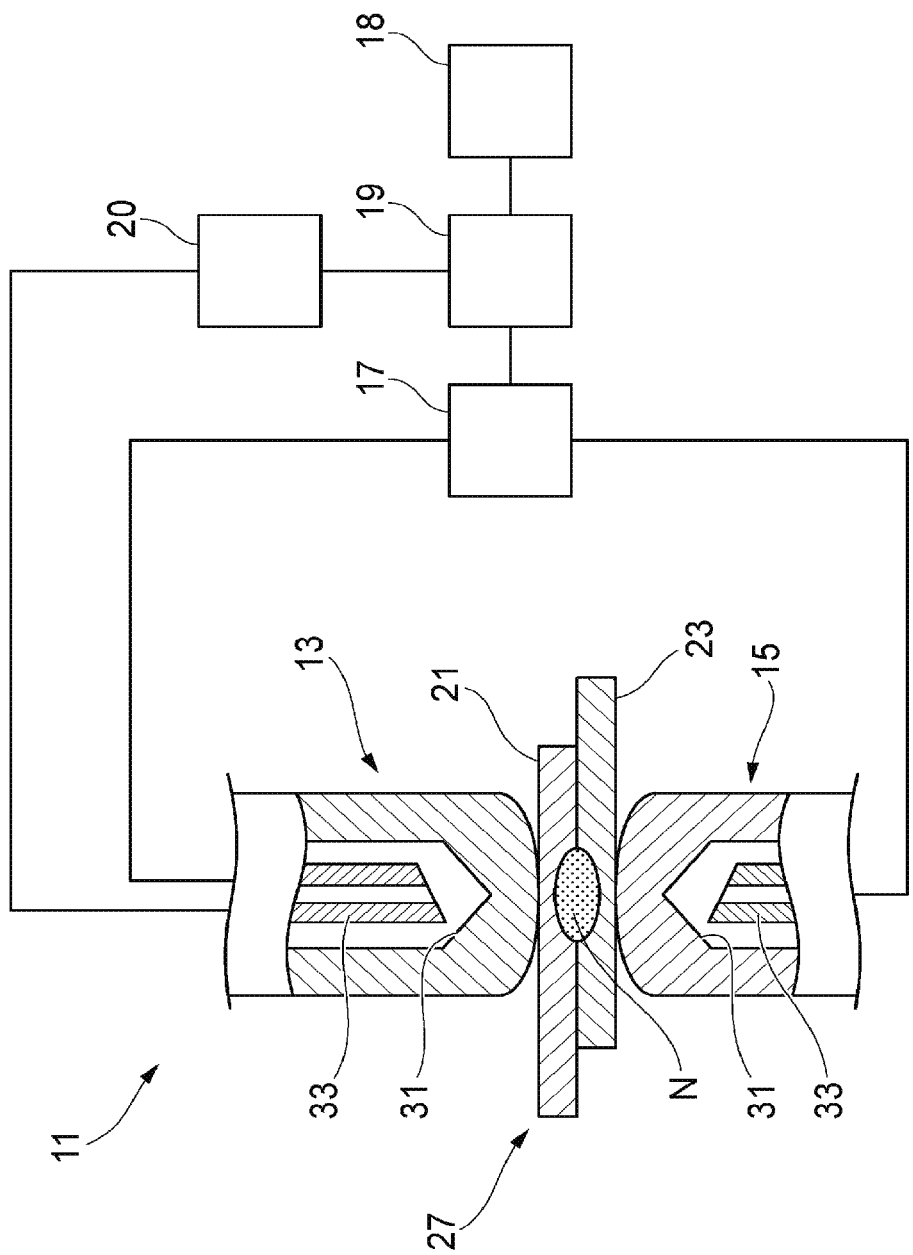
FIG. 1 is a schematic configuration view of a spot welding machine configured to weld aluminum materials.

FIG. 1 is a schematic configuration view showing main parts of a spot welding machine configured to weld aluminum materials.

A spot welding machine 11 includes a pair of electrodes 13 and 15, a welding transformer unit 17 connected to the pair of electrodes 13 and 15, a control unit 19 configured to supply a welding electric power from a power source unit 18 to the welding transformer unit 17, and an electrode drive unit 20 configured to move the pair of electrodes 13 and 15 in an axis direction. The control unit 19 is configured to collectively control a current value, an energization time, a pressurizing force of an electrode, an energization timing, a pressurizing timing, and the like.

The spot welding machine 11 is configured to superimpose and pinch at least two plates of a first aluminum plate 21 and a second aluminum plate 23, which are aluminum materials, between the pair of electrodes 13 and 15. The spot welding machine is configured to pressurize the first aluminum plate 21 and the second aluminum plate 23 in a plate thickness direction by drive of the electrodes 13 and 15 by the electrode drive unit 20. In the pressurizing state, the electrodes 13 and 15 are electrified therebetween. Thereby, a nugget N is formed between the first aluminum plate 21 and the second aluminum plate 23 pinched between the electrodes 13 and 15, so that an aluminum welded joint (joined body) 27 where the first aluminum plate 21 and the second aluminum plate 23 are integrated is formed.

In the above example, the two aluminum plates are joined to obtain the aluminum welded joint 27. However, the present invention is not limited to the case where the two aluminum plates are joined, and can also be favorably used for joining three or more aluminum plates.

The pair of electrodes 13 and 15 is each an R-type or DR-type electrode having a curved end face. The pair of electrodes 13 and 15 each has a cooling part provided therein. Although a cooling method of the cooling part is not particularly limited, in the shown configuration, cooling pipes 33 are arranged in concave portions 31 formed in each of the electrodes 13 and 15, and a cooling medium such as water is supplied from the cooling pipes 33, so that the electrodes 13 and 15 are cooled.

<Aluminum Material>

The first aluminum plate 21 and the second aluminum plate 23 are heat-treated aluminum alloys, specifically, 6000 series aluminum alloys. A plate thickness of each of the first aluminum plate 21 and the second aluminum plate 23 (including an additional aluminum plate when the additional aluminum plate is used) is preferably 0.5 mm or larger, and more preferably 2.0 mm or larger, for a use of a structural member such as a frame member of an automobile, for example. The plate thicknesses of the aluminum plates may be the same or one may be greater than the other. The type of the aluminum material is not limited to the above aluminum plate (rolled plate), and may also be an extruded material, a forged material or a cast material.

In the below, as aspect where the two aluminum plates of the first aluminum plate 21 and the second aluminum plate 23 are joined is described. However, the present invention is not limited to the aspect.

<Welding Conditions>

Figure 2:
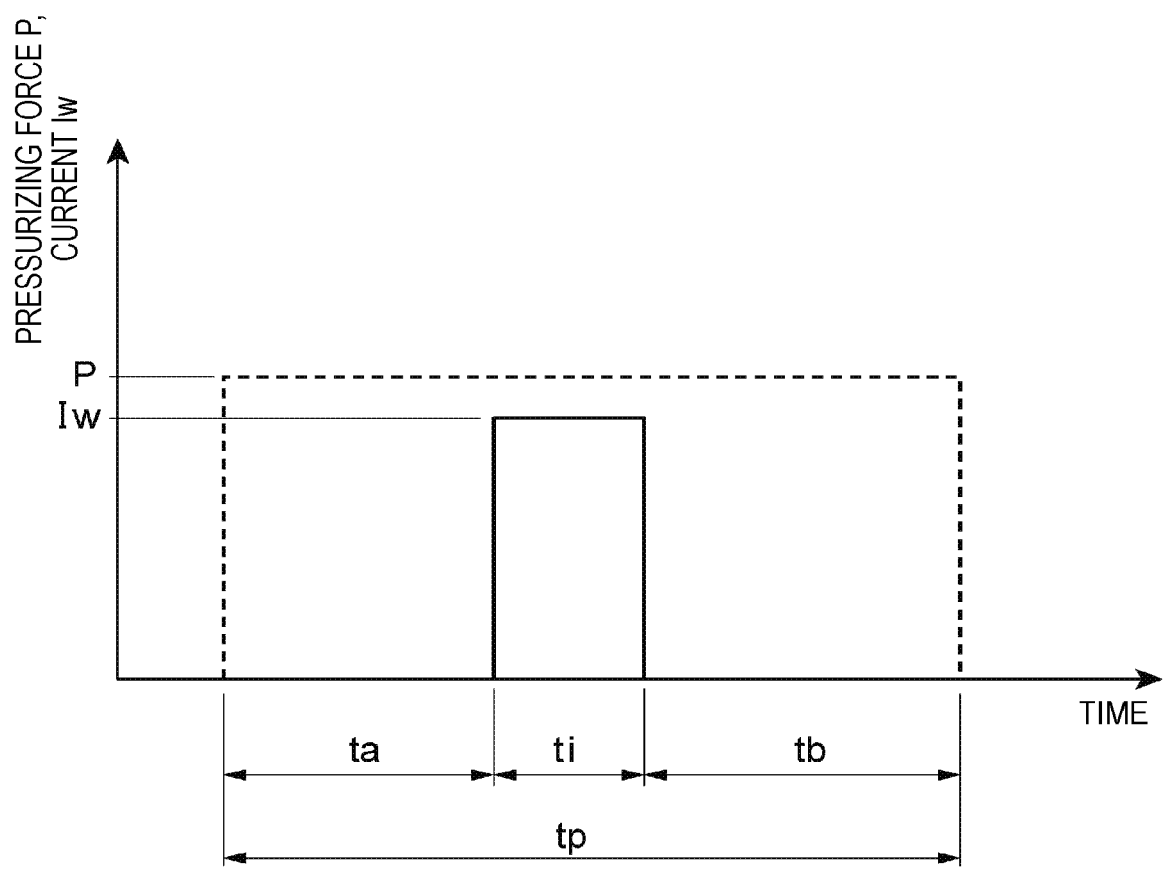
FIG. 2 is a timing chart showing timings at which a welding current and a pressurizing force are applied.

FIG. 2 is a timing chart showing an example of waveforms of a welding current and a pressurizing force.

As shown in FIG. 2, the control unit 19 electrifies a welding current Iw between the electrodes 13 and 15 during a pressurizing time tp from start of pressurizing to end of pressurizing by the electrodes 13 and 15. The welding current Iw that is electrified between the electrodes 13 and 15 is a single pulse current. The energization of the welding current Iw starts after time ta from start of pressurizing by the electrodes 13 and 15 and the energization is maintained for time ti. The pressurizing by the electrodes 13 and 15 stops after time tb since the energization of the welding current Iw ends.

The welding current Iw is 15 to 30 kA, and the energization time ti of the welding current Iw is 100 to 500 ms. The pressurizing force by the electrodes 13 and 15 is 2 to 4 kN. For example, time ta from start of pressurizing to start of energization is 600 ms, and time tb from end of energization to end of pressurizing is 400 ms.

<Welding Procedure>

(Working Process)

Figure 3A:
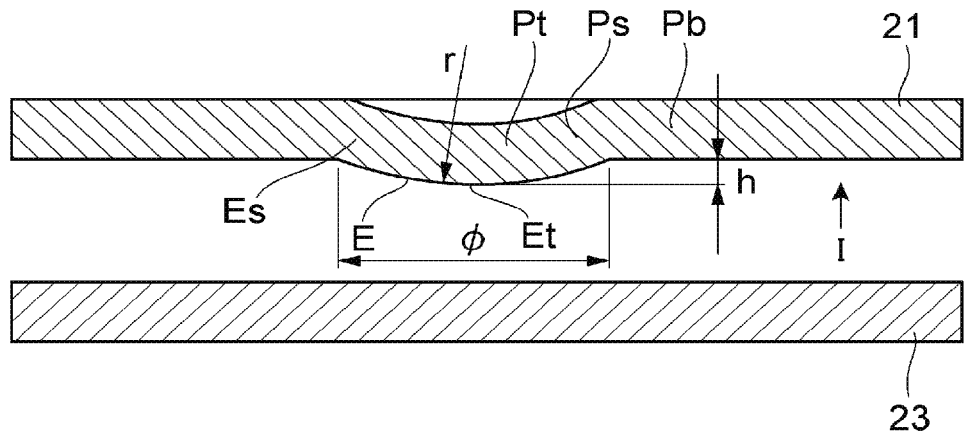
FIG. 3A schematically illustrate a working process and an arrangement process.
Figure 4:
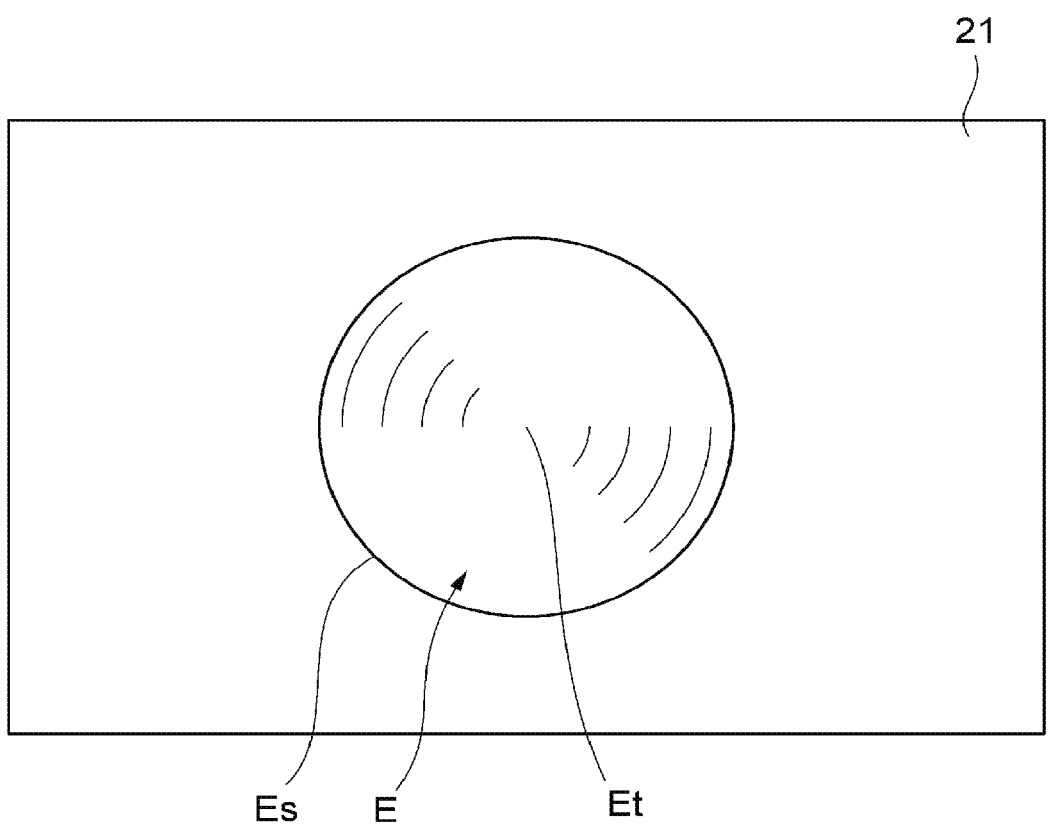
FIG. 4 is a plan view, as seen in an I direction in FIG. 3A.

As shown in FIGS. 3A and 4, embossing is performed for the first aluminum plate 21. Specifically, an emboss E having a circular shape in plan view and bulging in a direction of superimposition on the second aluminum plate 23-side is formed in a welding-intended position of the first aluminum plate 21 by press working or the like. When the emboss E is formed in this way, a peripheral edge portion Es of the emboss E is harder than the other part of the first aluminum plate 21 by work hardening.

Here, an outer diameter $\phi$ of the emboss E is $3\sqrt{t}$ to $7\sqrt{t}$ mm (t: plate thickness), an emboss height h from a surface of the first aluminum plate 21 facing toward the second aluminum plate 23 to an apex portion Et of the emboss E is preferably equal to or smaller than t/2 mm, and a curvature radius r of the protrusion-side of the emboss E is preferably smaller than curvature radii of ends of the electrodes 13 and 15. Also, the emboss E is formed so that a diameter $\phi$n of a root portion En of the bulging part is smaller than diameters $\phi$d of the ends of the electrodes 13 and 15. In other words, as the electrodes 13 and 15 that are used for welding, electrodes each having an end diameter $\phi$d larger than the diameter $\phi$n of the root portion En of the emboss E are used (refer to FIG. 5).

(Adhesive Applying Process)

Figure 3B:
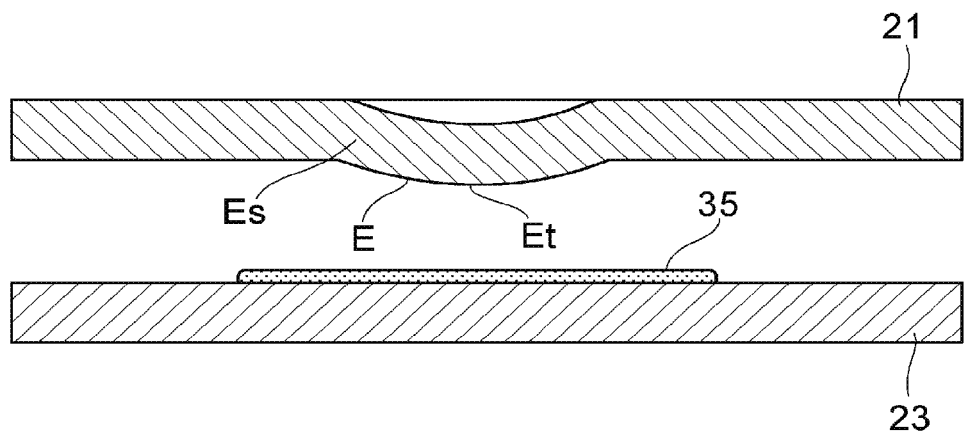
FIG. 3B schematically illustrate a working process and an arrangement process.

As shown in FIG. 3B, an adhesive 35 is applied in a welding-intended position on a surface of the second aluminum plate 23 facing the first aluminum plate 21. As the adhesive 35, for example, an epoxy resin is favorably used. Note that, the adhesive 35 may also be applied in a welding-intended position on a surface of the first aluminum plate 21 facing the second aluminum plate 23 or may also be applied in welding-intended positions of facing surfaces of the first aluminum plate 21 and the second aluminum plate 23.

(Arrangement Process)

Figure 3C:
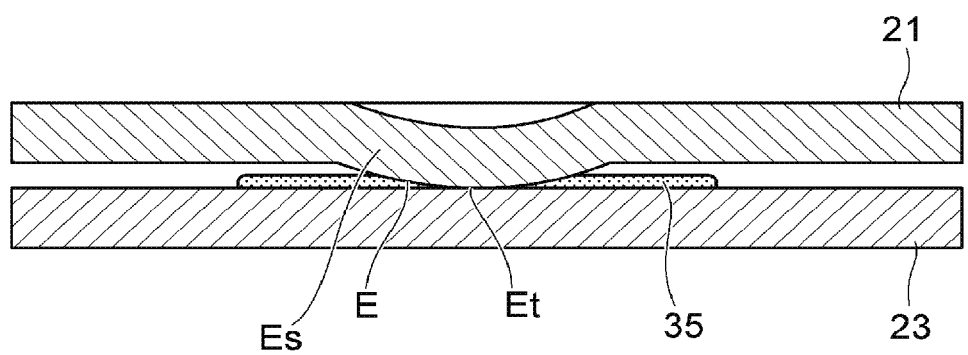
FIG. 3C schematically illustrate a working process and an arrangement process.
Figure 5:
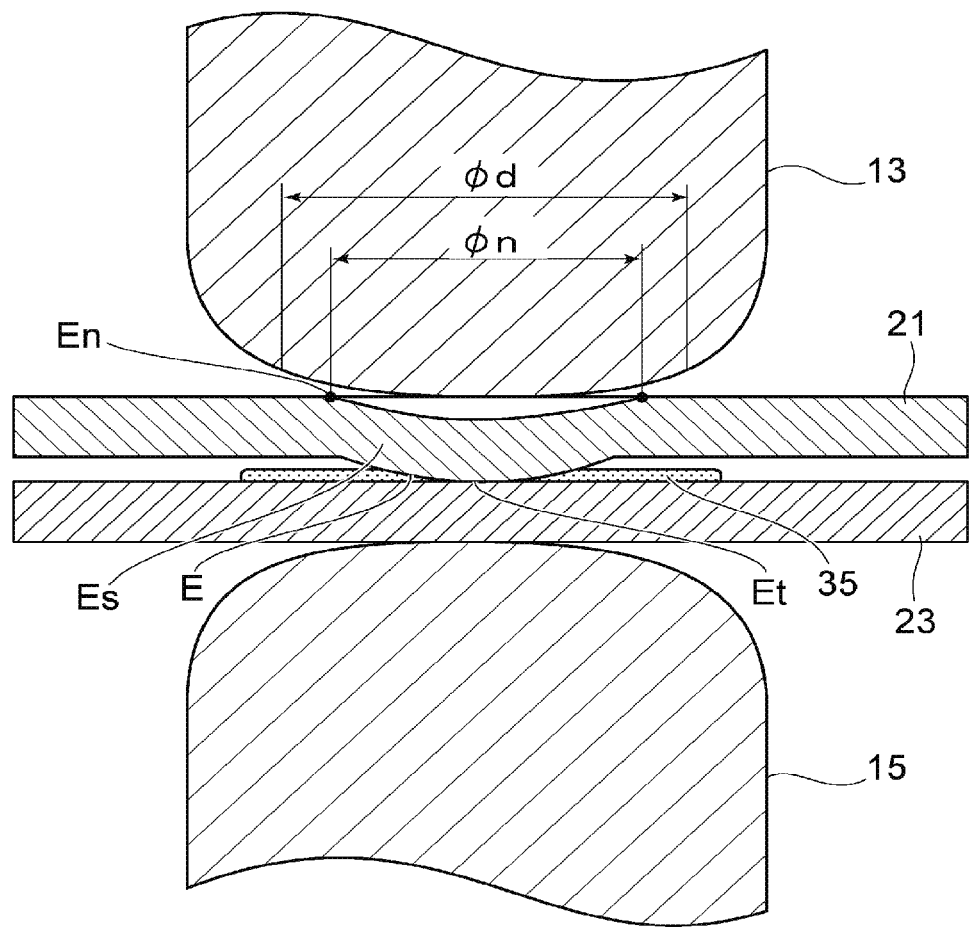
FIG. 5 schematically illustrates an aspect of the arrangement process.

As shown in FIG. 3C, the protrusion-side of the emboss E of the first aluminum plate 21 is made to face toward the second aluminum plate 23, and the first aluminum plate 21 and the second aluminum plate 23 are superimposed each other. Then, as shown in FIG. 5, the first aluminum plate 21 and the second aluminum plate 23 superimposed each other are arranged between the pair of electrodes 13 and 15, and the welding-intended positions of the first aluminum plate 21 and the second aluminum plate 23 are arranged in pressurizing energization positions by the electrodes 13 and 15.

(Pressurizing Process)

Then, the first aluminum plate 21 and the second aluminum plate 23 are pinched and pressurized in the plate thickness direction by the electrode drive unit 20. At this time, the pressurizing force by the electrodes 13 and 15 is preferably 2 to 4 kN.

Figure 6:
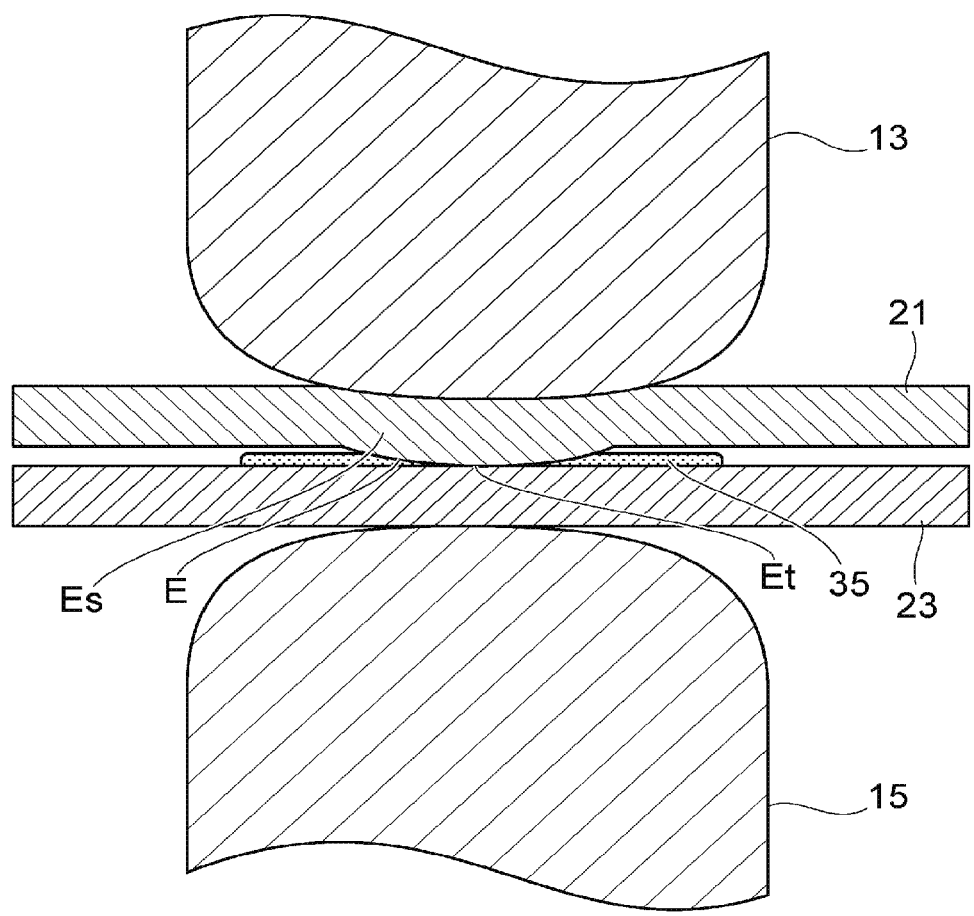
FIG. 6 schematically illustrates an aspect of the pressurizing process.

As shown in FIG. 6, when the first aluminum plate 21 and the second aluminum 23 are pressurized, the apex portion Et of the emboss E of the first aluminum plate 21 is first pressed against the surface of the second aluminum plate 23. Thereby, the apex portion Et of the emboss E is pushed-in in a direction opposite to the protruding direction. Also, the apex portion Et of the emboss E is pushed-in and the adhesive 35 applied on the surface of the second aluminum plate 23 is pushed to an outer periphery-side of the emboss E.

Figure 7:
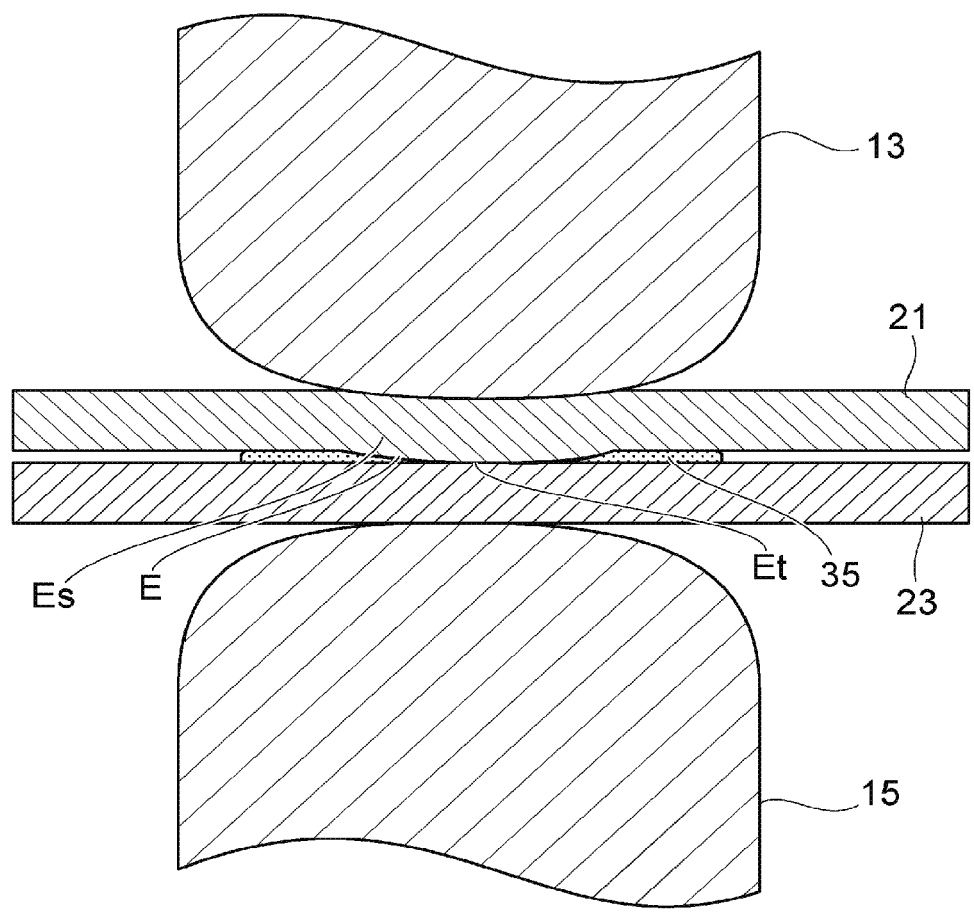
FIG. 7 schematically illustrates an aspect of the pressurizing process.

As shown in FIG. 7, when the first aluminum plate 21 and the second aluminum plate 23 are further pressurized, the apex portion Et of the emboss E is further pushed-in, so that a contact area of the emboss E with the surface of the second aluminum plate 23 increases in a radial direction. Thereby, the adhesive 35 applied on the surface of the second aluminum plate 23 is further pushed to the outer periphery of the emboss E.

Figure 8:
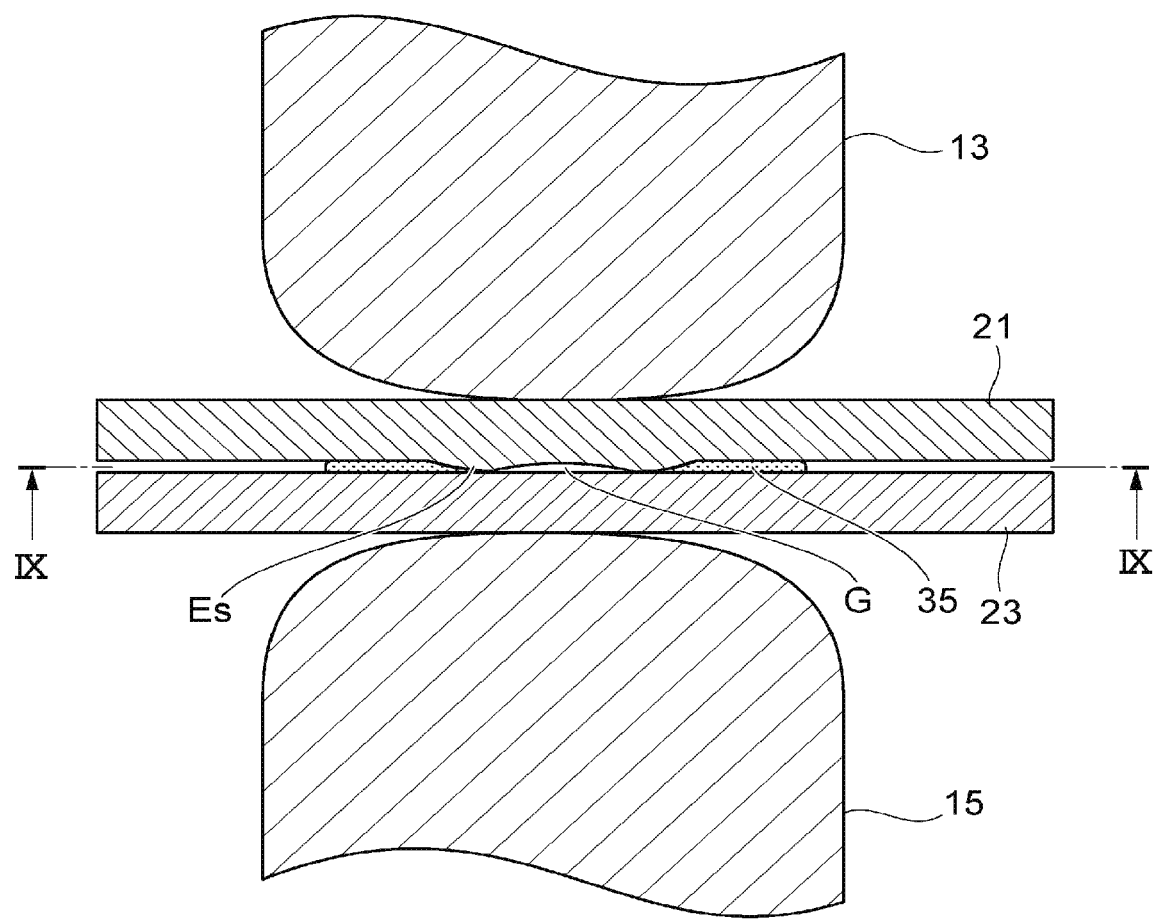
FIG. 8 schematically illustrates an aspect of the pressurizing process.
Figure 9:
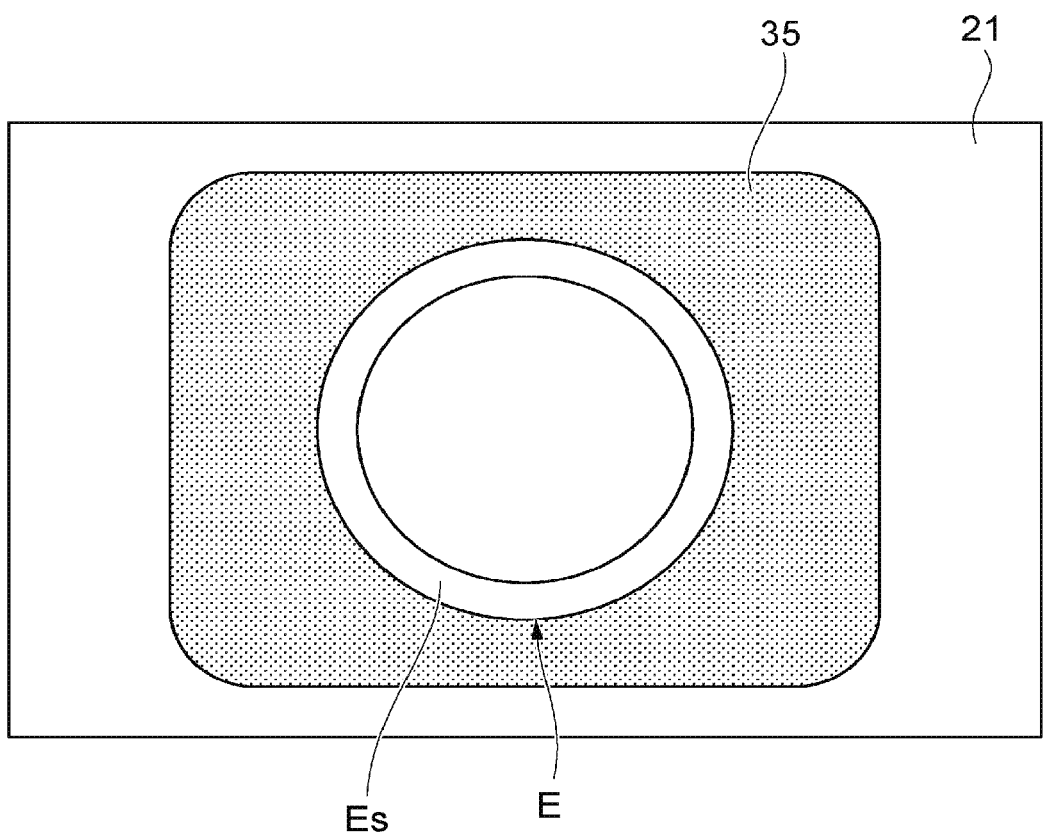
FIG. 9 is a sectional view taken along an IX-IX line in FIG. 8.

As shown in FIG. 8, when the first aluminum plate 21 and the second aluminum plate 23 are further pressurized, a central side including the apex portion Et of the emboss E is deformed in a direction opposite to the protruding direction with the peripheral edge portion Es hardened by the work hardening as a fulcrum. Thereby, as shown in FIGS. 8 and 9, the emboss E is recessed on the central side and only the peripheral edge portion Es slightly protrudes in an annular shape toward the second aluminum plate 23, so that the peripheral edge portion Es of the emboss E protruding in the annular shape is in contact with the second aluminum plate 23. In this state, a slight gap G is formed between the surface of the second aluminum plate 23 and the central side of the emboss E. Also, since the adhesive 35 is pushed to the outer periphery-side of the emboss E, the gap G between the second aluminum plate 23 and the central side of the emboss E is a space in which the adhesive 35 does not exist.

Here, the Vickers hardness of the peripheral edge portion Es of the emboss E is denoted as Hs, the Vickers hardness of the apex portion Et of the emboss E is denoted as Ht, and the Vickers hardness of the base metal, which is hardness of the first aluminum plate 21, is denoted as Hb. When the hardness satisfies a relation of $Hs>Ht \geq Hb$, the emboss E is less likely to be crushed by improvement on the stiffness of the peripheral edge portion Es of the emboss E and the apex portion Et of the emboss E. For this reason, when pressurizing the first aluminum plate 21 and the second aluminum plate 23, the adhesive 35 can be better excluded to the outer periphery-side. Also, after the exclusion of the adhesive 35 is over, since the stiffness of the apex portion Et of the emboss E is lower than the peripheral edge portion Es, the central side is recessed and only the peripheral edge portion Es slightly protrudes in an annular shape toward the second aluminum plate 23, as described above, so that the slight gap G is formed on the central side of the emboss E. Further, when a difference $|Hs-Ht|$ between the Vickers hardness Hs of the peripheral edge portion Es and the Vickers hardness Ht of the apex portion Et is within 10, it is easier to exclude the adhesive 35 and to form the gap G, so that after an energizing process, which will be described later, an aluminum welded joint 27, which is a spot-welded body having high joint strength, is obtained.

Also, as shown in FIG. 5, as each of the electrodes 13 and 15 used for welding, the electrode having the end diameter $\phi d$ larger than the diameter $\phi n$ of the root portion En of the bulging part of the emboss E is used. Thereby, in the pressurizing process, the pressurizing can be performed while the electrode 13 is brought into equal contact with the root portion En of the emboss E, so that the emboss E can be equally pressed and crushed.

(Energizing Process)

Figure 10:
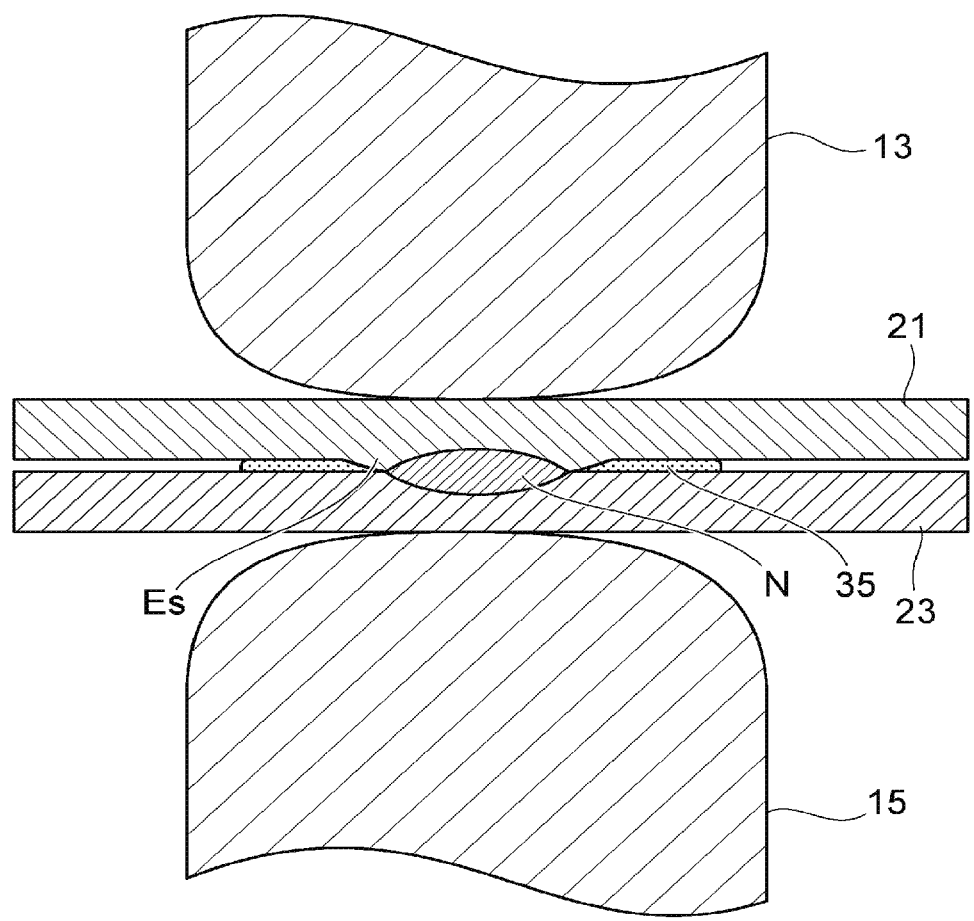
FIG. 10 schematically illustrates an aspect of an energizing process.

In this state, while maintaining the pressurizing state, the welding current Iw is electrified between the electrodes 13 and 15 from the welding transformer unit 17. Then, as shown in FIG. 10, the first aluminum plate 21 and the second aluminum plate 21 start to be molten in the welding-intended positions between the electrodes 13 and 15. At this time, since the peripheral edge portion Es of the emboss E is pressed against the surface of the second aluminum plate 23 and the gap G is formed on the central side of the emboss E, the melting in the welding-intended positions starts from the peripheral edge portion Es of the emboss E and progresses toward the center. Thereby, the molten aluminum generated by the energization does not flow out to the outer periphery of the emboss E, and the gap G is filled with the molten aluminum.

Figure 11:
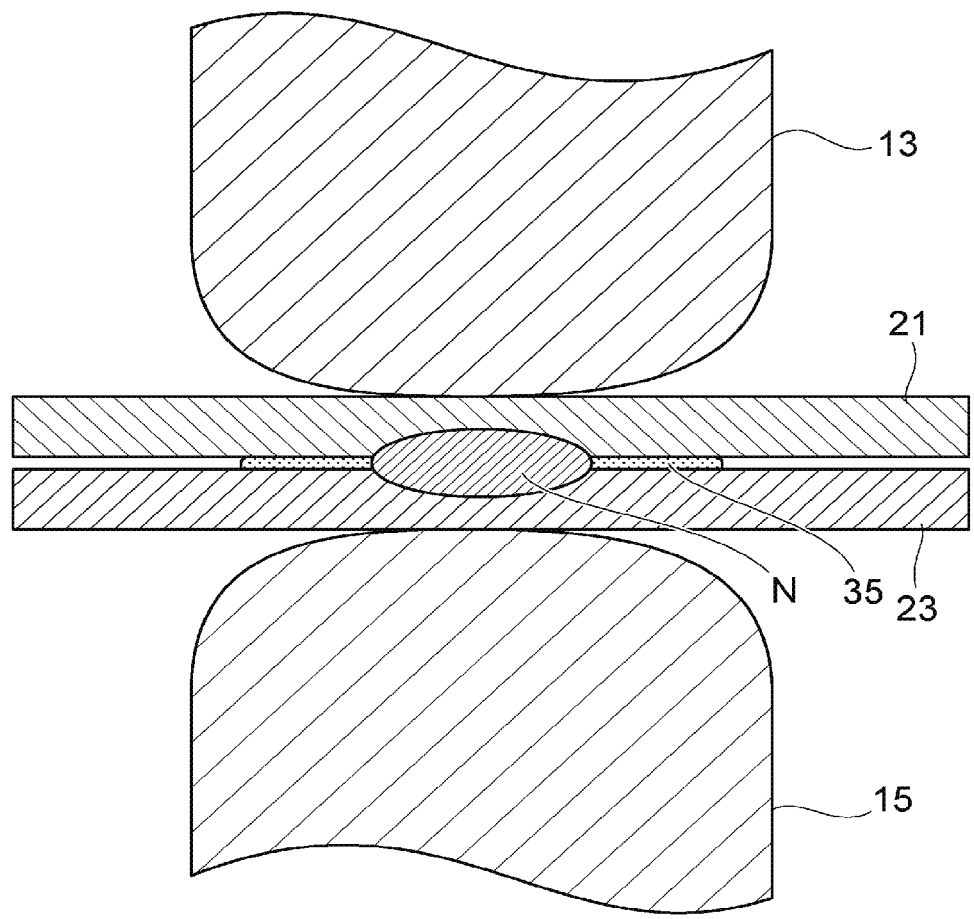
FIG. 11 schematically illustrates an aspect of the energizing process.

When the energization is performed during a set energization time, a nugget N is formed in the welding-intended positions of the first aluminum plate 21 and the second aluminum plate 23, as shown in FIG. 11, so that the aluminum welded joint 27 is formed in which the first aluminum plate 21 and the second aluminum plate 23 are integrated. After the energization, the electrodes 13 and 15 are separated, and the aluminum welded joint 27 where the first aluminum plate 21 and the second aluminum plate 23 are integrated is taken out from the spot welding machine 11.

By the above processes, the aluminum welded joint 27 where the first aluminum plate 21 and the second aluminum plate 23 are integrated by the spot welding is obtained.

As described above, according to the spot welding method for an aluminum material of the present embodiment, the circular emboss E, as seen from above, bulging in the direction of superimposition on the second aluminum plate 23-side is formed in advance in the welding-intended position of the first aluminum plate 21. The emboss E formed in this way is work-hardened at the peripheral edge portion Es thereof. The bulging side of the emboss E is placed toward the second aluminum plate 23, the welding-intended positions are superimposed, and the first aluminum plate 21 and the second aluminum plate 23 superimposed each other are pinched and pressurized with the electrodes 13 and 15. Thereby, the central side of the emboss E excluding the work-hardened peripheral edge portion Es of the emboss E is recessed, and the energization is performed between the electrodes 13 and 15 while continuing the pressurizing. Then, the first aluminum plate 21 and the second aluminum plate 23 start to be molten in the welding-intended positions between the electrodes 13 and 15.

At this time, since the peripheral edge portion Es of the emboss E is pressed against the surface of the second aluminum plate 23 and the gap G is formed on the central side of the emboss E, the melting in the welding-intended positions can be caused to start from the peripheral edge portion Es of the emboss E and to progress toward the center. Thereby, it is possible to form the nugget N by filling the gap G with the molten aluminum without causing the molten aluminum generated due to the energization to flow out to the outer periphery of the emboss E. Therefore, the nugget N having the high roundness and excellent penetration rate into the aluminum plates 21 and 23, which are the base metals, is formed, so that the high-quality aluminum welded joint 27 where the aluminum plates 21 and 23 are favorably joined to each other is obtained.

Also, since it is possible to suppress the nugget N from excessively thickening to be exposed to the surface, the molten aluminum is not attached to the surfaces of the electrodes 13 and 15. Therefore, it is not necessary to frequently perform dressing of the electrodes 13 and 15, which can improve the productivity.

In addition, the Vickers hardness Hs of the peripheral edge portion Es of the emboss E, the Vickers hardness Ht of the apex portion Et of the emboss E and the Vickers hardness Hb of the aluminum material 21, which is the base metal, satisfy the relation of Hs>Ht≥Hb. Thereby, due to the improved stiffness of the peripheral edge portion Es of the emboss E and the apex portion Et of the emboss E, the emboss E is less likely to be crushed and the adhesive 35 can be favorably excluded to the outer periphery-side during the pressurizing, so that it is possible to suppress the influence of the adhesive 35 during welding.

In particular, when the difference |Hs-Ht| between the Vickers hardness Hs of the peripheral edge portion Es of the emboss E and the Vickers hardness Ht of the apex portion Et of the emboss E is within 10, the stiffness of the peripheral edge portion Es of the emboss E and the apex portion Et of the emboss E can be improved in a balanced manner, so that the adhesive 35 can be better excluded during the pressurizing.

Figure 12:
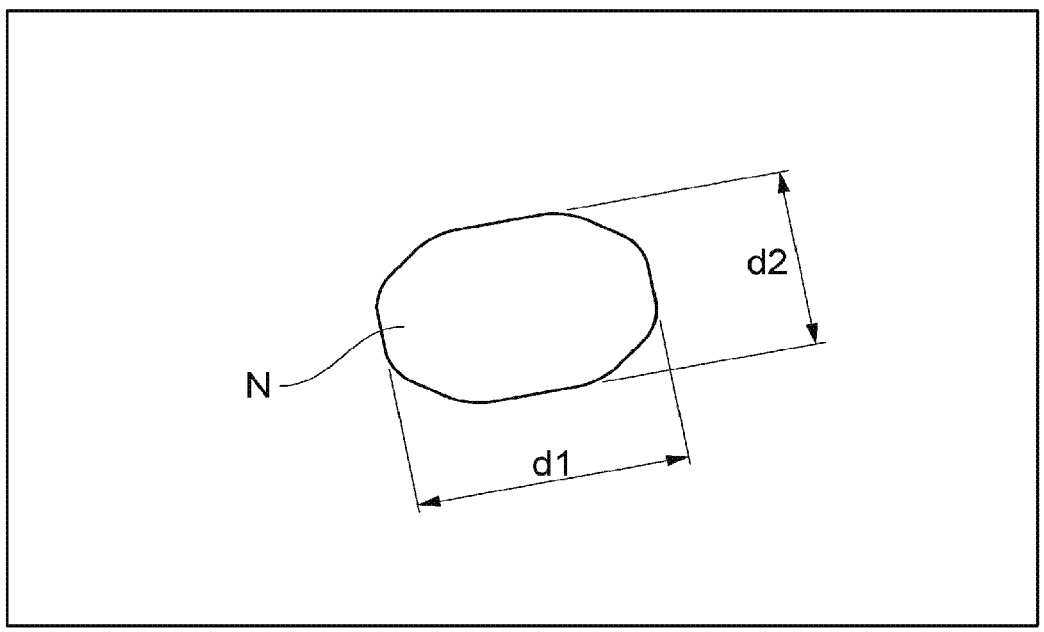
FIG. 12 is a schematic plan view of a nugget for illustrating roundness of the nugget.
Figure 13:
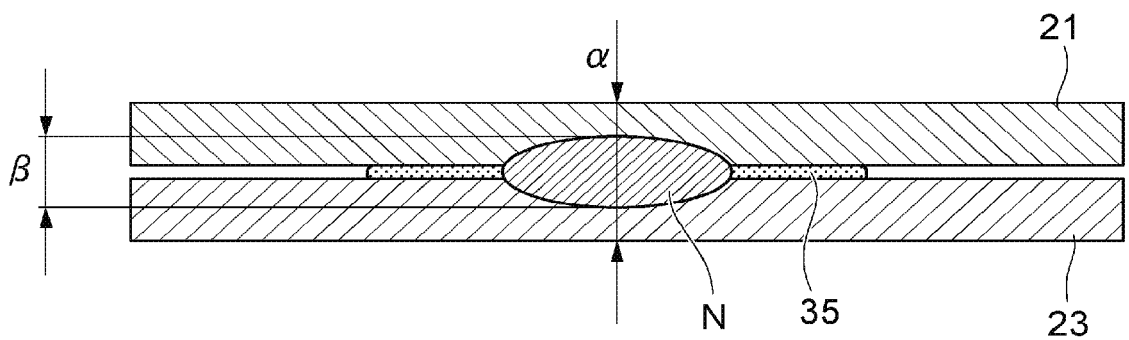
FIG. 13 is a sectional view of an aluminum welded joint for illustrating a penetration rate of molten aluminum into an aluminum plate in the nugget.

Note that, as shown in FIG. 12, the roundness of the nugget N is an absolute value |d1-d2| of a difference between a major radius d1 and a minor radius d2 of the nugget N, as seen from above, and increases as the absolute value is closer to 0 (zero). Also, as shown in FIG. 13, the penetration rate of the nugget G is expressed by a ratio β/α of a thickness β of the nugget G to a thickness α of the welded part, in a cross sectional view, and is preferably 0.3 to 0.7.

In the present embodiment, as each of the electrodes 13 and 15, the R-type or DR-type electrode having a curved end face is used. Since the end face of each of the electrodes 13 and 15 is a curved surface, it is possible to suppress influences of angle variations of the electrodes 13 and 15 and partial contacts (non-uniform contacts) of the electrodes, as compared to electrodes each having a flat end shape, so that stable pressurizing can be performed on the aluminum plates 21 and 23. Thereby, it is possible to form the nugget N having high roundness and to perform high-quality welding.

Further, in the present embodiment, the adhesive 35 is applied in the welding-intended position on the surface of the second aluminum plate 23 facing the first aluminum plate 21. Thereby, it is possible to bond the aluminum plates 21 and 23 by the adhesive 35 around the welding place where the nugget N is formed, and the joining of the welding place by the spot welding and the bonding by the adhesive 35 are combined, so that it is possible to make the stronger joining, and particularly, to increase the peeling resistance to improve the surface stiffness of the aluminum welded joint 27. Further, the first aluminum plate 21 is formed with the emboss E, so that, when the superimposed aluminum plates 21 and 23 are pressurized with the electrodes 13 and 15, the adhesive 35 can be pushed to the outer periphery-side of the welding-intended positions. Therefore, it is possible to suppress the influence of the adhesive 35 on the welded parts of the aluminum plates 21 and 23, so that the spot welding is favorably performed. Further, the high-strength aluminum welded joint 27 joined also by the adhesive 35 is obtained.

Figure 14:
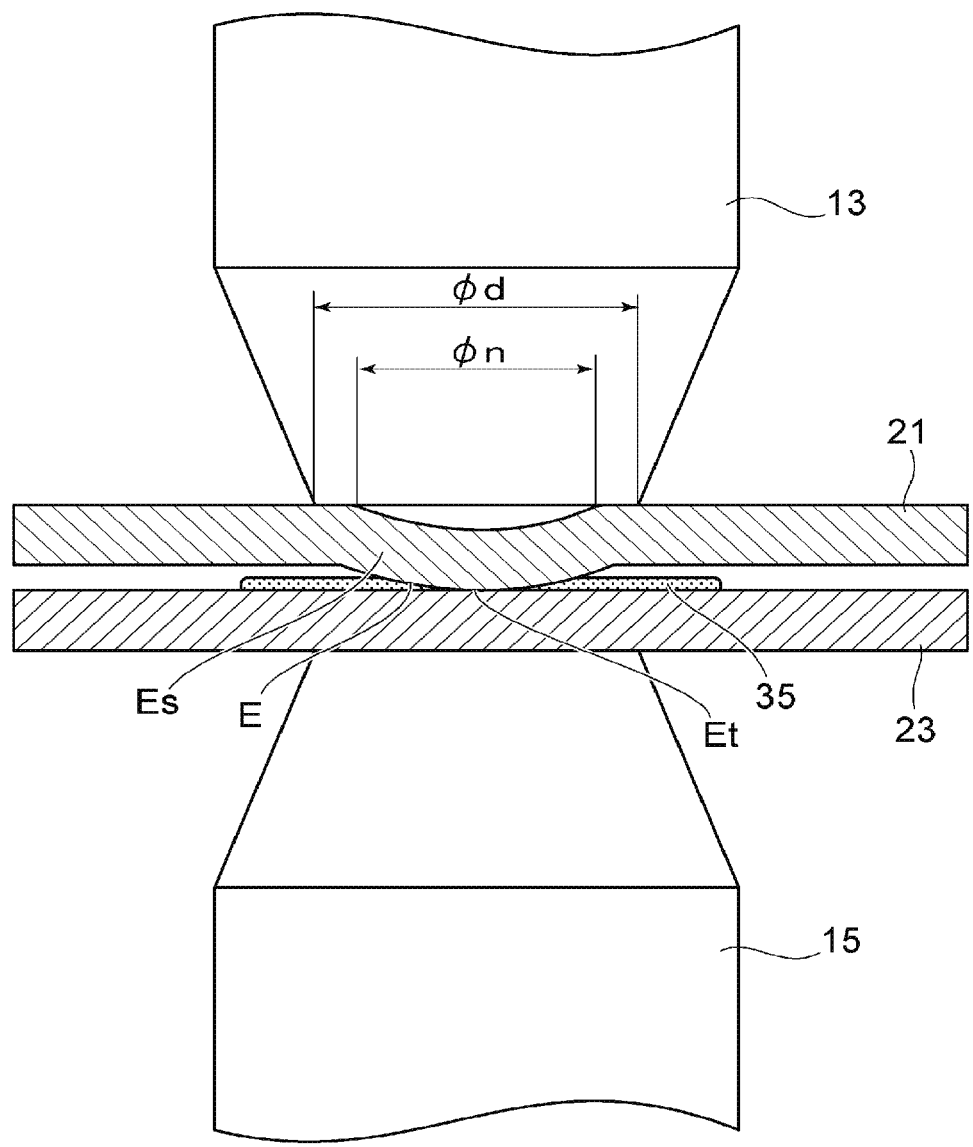
FIG. 14 is a schematic side view schematically showing an example where a flat-type electrode is used.

In the above embodiment, the R-type or DR-type electrodes 13 and 15 each having a curved end face are used. However, as shown in FIG. 14, as the electrodes 13 and 15, an F-type electrode and the like whose end face is planar and an end diameter ϕd of the electrode is larger than the diameter ϕn of the root portion of the bulging part of the emboss may also be used. When the F-type electrodes each having a planar end face are used as the electrodes 13 and 15, since the end faces of the electrodes 13 and 15 are planar, it is possible to pressurize the entire welding-intended positions in which the emboss E is formed in a balanced manner. Thereby, it is possible to form the nugget N having high roundness and to perform high-quality welding.

Further, in the above embodiment, the adhesive 35 is applied on the surface of the aluminum plate 23 facing the aluminum plate 21. However, the present invention can also be applied to a case where welding is performed without using the adhesive 35.

EXAMPLES

When spot-welding two aluminum plates to form a joined body, one aluminum plate was formed with embosses of different heights, and states of nuggets formed in the manufactured joined body were evaluated. Specifically, for the nugget after welding, the nugget diameter, the roundness, the penetration rate, the penetration depth, the thickness of the welded part, and the break diameter were measured and evaluated. Note that, the evaluation was performed for each of a case (Test Example 1) where the adhesive was not applied and a case (Test Example 2) where the adhesive was applied.

<Test Conditions>
(Aluminum Material)
  Material: A6022
  Plate thickness t: 1.0 mm
(Electrode)
  Type: Cr—Cu R-type electrode
  Curvature radius of end: 100 mm
  Diameter of electrode (circle diameter): 19 mm
  Pressurizing force between electrodes: 2.7 kN
  Welding current: 22 kA Test Results Test Example 1

The measurement results for the case where one aluminum plate was formed with embosses of different heights and welding was performed without applying the adhesive are shown in Table 1. In the evaluation result, ○ indicates that all the values of |d1-d2| of the nugget are smaller than 1, and Δ indicates that there is one of the values of |d1-d2| of the nugget is equal to or larger than 1

TABLE 1

| | Emboss Hight [mm] | Nugget Diameter [mm] | Roundness | Penetration Rate [%] | Penetration Depth [mm] | Plate Thickness of Welded Part [mm] | Break Diameter [mm] | Evaluation |
|---|---|---|---|---|---|---|---|---|
| Test Example 1-1 | 0.25 | 4.80 | 0.60 | 49.2 | 0.94 | 1.91 | 4.5√t | ○ |
| Test Example 1-2 | 0.50 | 4.60 | 0.10 | 41.5 | 0.80 | 1.93 | 4.5√t | ○ |
| Test Example 1-3 | 0.75 | 4.48 | 0.45 | 37.2 | 0.71 | 1.91 | 4.8√t | ○ |
| Test Example 1-4 | 1.00 | 3.56 | 0.63 | 33.5 | 0.65 | 1.94 | 3.9√t | ○ |

(t = 1.0 mm)

In Test Example 1 where the adhesive was not applied, for any of Test Examples 1-1 to 1-4 where the heights of the embosses were different, the nugget had the appropriate penetration rate and the high roundness, so that the favorable evaluation (○) was obtained.

Test Example 2

The measurement results for the case where one aluminum plate was formed with embosses of different heights and welding was performed with the adhesive being applied are shown in Test Examples 2-1 to 2-4 of Table 2. As Comparative Example, the measurement result for the case where welding was performed with the adhesive being applied on a flat plate is shown in Test Example 2-5. In Table 2, the measurement values of the Vickers hardness Hs of the peripheral edge portion of the emboss, the Vickers hardness Ht of the apex portion of the emboss, and the Vickers hardness Hb of the aluminum material, which is the base metal, and the difference |Hs-Ht| between the Vickers hardness Hs of the peripheral edge portion of the emboss and the Vickers hardness Ht of the apex portion of the emboss are shown in Test Examples 2-1 to 2-4. Also, in Table 2, the measurement value of the Vickers hardness Hb of the aluminum material, which is the base metal, is shown in Test Example 2-5. Note that, the measurement load of each of the hardness Hs, Ht and Hb was 100 kg, and the hardness was each measured in the measurement positions Ps, Pt and Pb shown in FIG. 3A.

TABLE 2

| | Emboss Hight [mm] | Hardness | | | | Nugget Diameter [mm] | Roundness | Penetration Rate [%] | Penetration Depth [mm] | Plate Thickness of Welded Part [mm] | Break Diameter [mm] | State of Welded Part | Evaluation |
|---|---|---|---|---|---|---|---|---|---|---|---|---|---|
| | | Hb | Hs | Ht | |Hs-Ht| | | | | | | | | |
| Test Example 2-1 | 0.25 | 70.8 | 83.2 | 70.8 | 12.4 | 3.46 | 0.43 | 23.3 | 0.44 | 1.89 | 5.0√t | No spatter, No crack | ○ |
| Test Example 2-2 | 0.50 | 70.4 | 92.3 | 83.9 | 8.4 | 5.54 | 0.37 | 47.6 | 0.91 | 1.91 | 5.4√t | No spatter, No crack | ○ |
| Test Example 2-3 | 0.75 | 68.7 | 92.1 | 77.4 | 14.7 | 5.92 | 1.48 | 53.4 | 1.02 | 1.91 | 4.5√t | Slight spatter, No crack | △ |
| Test Example 2-4 | 1.00 | 69.1 | 102 | 76.5 | 25.5 | 5.35 | 1.54 | 44.7 | 0.84 | 1.88 | 4.0√t | Slight spatter, No crack | △ |
| Test Example 2-5 | — | 69.8 | — | — | — | 47.5 | 1.92 | 52.4 | 0.99 | 1.89 | 4.05√t | Spatter and Crack were generated | X |

(t = 1.0 mm)

In Test Example 2 where welding was performed with the adhesive being applied, for any of Test Examples 2-1 to 2-4 where the heights of the embosses were different, the nugget had the appropriate penetration rate. Also, in Test Examples 2-1 and 2-2, the nugget having high roundness was formed and spatter or crack was not generated in the welded part, so that the evaluation result (○) was obtained. In Test Example 2-2, the break diameter was largest. In Test Examples 2-3 and 2-4, the roundness of the nugget was lightly reduced and slight spatter was generated although it was within the allowable range. Therefore, the evaluation result (Δ) was obtained. It is thought that this is because when welding is performed with the adhesive being applied, the height of the emboss is high and the balance of the aluminum plate is thus upset during the pressurizing. Also, in Test Examples 2-1 to 2-4, the Vickers hardness Hs of the peripheral edge portion of the emboss, the Vickers hardness Ht of the apex portion of the emboss, and the Vickers hardness Hb of the base metal satisfy the relation of Hs>Ht≥Hb. In this case, due to the improved stiffness of the peripheral edge portion of the emboss and the apex portion of the emboss, the emboss is less likely to be crushed and the adhesive is favorably excluded to the outer periphery-side during the pressurizing. As a result, it is thought that spatter is suppressed. Note that, in Test Example 2-5 where the flat plate was used, the roundness of the nugget was lowest and spatter and crack were generated in the welded part, so that the evaluation result (×) was obtained.

The present invention is not limited to the above embodiment, and is intended for the combinations of the respective configurations of the embodiment and changes and applications made by one skilled in the art on the basis of the description of the specification and the well-known technology, which are also included within the scope of protection.

As described above, the present specification discloses following matters.

(1) A spot welding method for an aluminum material for superimposing and spot-welding a plurality of aluminum materials, the spot welding method including:
a working process of forming, in a welding-intended position of at least one aluminum material, an emboss having a circular shape in plan view and bulging in a direction of superimposition on other aluminum material-side;
an arrangement process of placing the bulging side of the emboss of the one aluminum material toward another aluminum material, superimposing welding-intended positions of the aluminum materials, and arranging the welding-intended positions between a pair of electrodes;
a pressurizing process of pinching and pressurizing the superimposed aluminum materials with the electrodes to push-in a central side of the emboss excluding a peripheral edge portion of the emboss; and
an energizing process of performing energization between the electrodes while causing the electrodes to continuously perform the pressurizing,
wherein, as the electrodes, electrodes each having a tip diameter larger than a diameter of a root side of the bulging part of the emboss are used.

According to the spot welding method for an aluminum material, the emboss having a circular shape in plan view and bulging in the direction of superimposition on the other aluminum material-side is formed in advance in the welding-intended position of at least one aluminum material. The emboss formed in this way is equally pushed and crushed by the electrodes, and the peripheral edge portion thereof is work-hardened. The bulging side of the emboss of the one aluminum material is placed toward another aluminum material, the welding-intended positions of the aluminum materials are superimposed, and the aluminum materials superimposed each other are pinched and pressurized with the electrodes. Thereby, the central side of the emboss excluding the work-hardened peripheral edge portion of the emboss is pushed-in and recessed, and the energization is performed between the electrodes while continuing the pressurizing. Then, the aluminum materials start to be molten in the welding-intended positions between the electrodes. At this time, since the peripheral edge portion of the emboss is pressed against the surface of the other aluminum plate and the gap is formed on the central side of the emboss, the melting in the welding-intended positions can be caused to start from the peripheral edge portion of the emboss and to progress toward the center. Also, it is possible to form the nugget by filling the gap with the molten aluminum without causing the molten aluminum generated due to the energization to flow out to the outer periphery of the emboss. Thereby, the nugget having high roundness and excellent penetration rate into the aluminum material, which is the base metal, is formed, so that the high-quality joined body where the aluminum materials are favorably joined is obtained. Further, since it is possible to suppress the nugget from excessively thickening to be exposed to the surface, the molten aluminum is not attached to the surfaces of the electrodes. Therefore, it is not necessary to frequently perform dressing of the electrodes and the productivity is improved.

(2) The spot welding method for an aluminum material according to the above (1), wherein in the working process of forming the emboss, the emboss satisfying a relation of Hs>Ht≥Hb is provided, where Hs is Vickers hardness of a peripheral edge portion of the emboss, Ht is Vickers hardness of an apex portion of the emboss, and Hb is Vickers hardness of the aluminum material.

According to the spot welding method for an aluminum material, the Vickers hardness Hs of the peripheral edge portion of the emboss, the Vickers hardness Ht of the apex portion of the emboss, and the Vickers hardness Hb of the base metal satisfy the relation of Hs>Ht≥Hb. Thereby, due to the improved stiffness of the peripheral edge portion of the emboss and the apex portion of the emboss, the emboss is less likely to be crushed and the adhesive can be favorably excluded to the outer periphery-side during the pressurizing, so that it is possible to suppress the influence of the adhesive during welding.

(3) The spot welding method for an aluminum material according to the above (1) or (2), wherein a difference |Hs-Ht| between the Vickers hardness Hs of the peripheral edge portion of the emboss and the Vickers hardness Ht of the apex portion of the emboss is within 10.

According to the spot welding method for an aluminum material, it is possible to improve the stiffness of the peripheral edge portion of the emboss and the apex portion of the emboss, in a balanced manner, so that the adhesive can be better excluded during the pressurizing.

(4) The spot welding method for an aluminum material according to one of the above (1) to (3), wherein an R-type or DR-type electrode having a curved end face is used as each of the electrodes.

According to the spot welding method for an aluminum material, since the end face of each of the electrodes is a curved surface, it is possible to suppress influences of angle variations of the electrodes and to perform stable pressurizing on the aluminum materials. Thereby, it is possible to form the nugget having high roundness and to perform high-quality welding.

(5) The spot welding method for an aluminum material according to one of the above (1) to (3), wherein an F-type electrode having a flat end face is used as each of the electrodes.

According to the spot welding method for an aluminum material, since the end face of each of the electrodes is a planar surface, it is possible to pressurize the entire welding-intended positions in which the emboss is formed, in a balanced manner. Thereby, it is possible to form the nugget having high roundness and to perform high-quality welding.

(6) The spot welding method for an aluminum material according to one of the above (1) to (5), further including an adhesive applying process of applying the adhesive to at least one of the welding-intended positions on the facing surfaces of the aluminum materials, before the arrangement process.

According to the spot welding method for an aluminum material, the aluminum materials can be bonded with the adhesive around a welding place where the nugget is formed. In addition, it is possible to strongly bond the place joined by the spot welding by the adhesive, and particularly, to improve the surface stiffness of the joined body by enhancing the peeling resistance. Further, the aluminum material is formed with the emboss, so that when pressurizing the superimposed aluminum materials with the electrodes, the adhesive is pushed to the outer periphery-side of the welding-intended positions. Therefore, it is possible to suppress the influence of the adhesive on the welded part of the aluminum materials, and to favorably perform the spot welding. Thereby, the high-strength joined body bonded with the adhesive is obtained.

(7) An aluminum material having an emboss formed at a spot-welded part and satisfying a relation of $Hs>Ht \geq Hb$, where Hs is Vickers hardness of a peripheral edge portion of the emboss, Ht is Vickers hardness of an apex portion of the emboss, and Hb is Vickers hardness of a base metal.

According to the aluminum material, the Vickers hardness Hs of the peripheral edge portion of the emboss, the Vickers hardness Ht of the apex portion of the emboss, and the Vickers hardness Hb of the base metal satisfy the relation of $Hs>Ht \geq Hb$. Thereby, when pressurizing and spot-welding the aluminum material and an aluminum material consisting of a flat plate, due to the improved stiffness of the peripheral edge portion of the emboss and the apex portion of the emboss, the emboss is less likely to be crushed and the adhesive can be favorably excluded to the outer periphery-side during the pressurizing, so that it is possible to suppress the influence of the adhesive during welding.

(8) The aluminum material according to the above (7), wherein a difference |Hs-Ht| between the Vickers hardness Hs of the peripheral edge portion of the emboss and the Vickers hardness Ht of the apex portion of the emboss is within 10.

According to the aluminum material, the stiffness of the peripheral edge portion of the emboss and the apex portion of the emboss is improved in a balanced manner, so that when pressurizing and spot-welding the aluminum material and an aluminum material consisting of a flat plate, the adhesive can be better excluded during pressurizing.

The present application is based on Japanese Patent Application Nos. 2019-68388 filed on Mar. 29, 2019 and 2020-26162 filed on Feb. 19, 2020, the contents of which are incorporated herein by reference.

REFERENCE SIGNS LIST 13, 15: electrode
21: first aluminum plate (aluminum material)
23: second aluminum plate (aluminum material)
35: adhesive
E: emboss
En: root portion
Es: peripheral edge portion
φd: end diameter
φn: diameter of root portion

The invention claimed is:

1. A spot welding method for superimposing and spot-welding aluminum materials together, the aluminum materials comprising a first aluminum material and a second aluminum material, the spot welding method comprising:
 forming, in a welding-intended position of at least the first aluminum material, an emboss having a circular shape in plan view and with a bulging part in a direction in which the second aluminum material is superimposed on the first aluminum material;
 placing the bulging part of the emboss of at least the first aluminum material toward the second aluminum material;
 superimposing welding-intended positions of the first and second aluminum materials;
 arranging the welding-intended positions between a pair of electrodes;
 pinching and pressurizing the superimposed first and second aluminum materials with the pair of electrodes to push-in a central side of the emboss excluding a peripheral edge portion of the emboss so that the central side of the emboss is deformed in a direction opposite to a protruding direction of the emboss; and
 energizing between the pair of electrodes while causing the pair of electrodes to continuously perform the pressurizing,
 wherein the pair of electrodes each have a tip diameter larger than a diameter of a root side of the bulging part of the emboss to equally apply one electrode of the pair of electrodes to a root portion of the bulging part of the emboss in the pressurizing.

2. The spot welding method for superimposing and spot-welding aluminum materials together according to claim 1, wherein in the forming of the emboss, the emboss satisfies a relation of $Hs>Ht \geq Hb$, wherein Hs is Vickers hardness of a peripheral edge portion of the emboss, Ht is Vickers hardness of an apex portion of the emboss, and Hb is Vickers hardness of the aluminum materials before spot welding is performed.

3. The spot welding method for superimposing and spot-welding aluminum materials together according to claim 1, wherein a difference |Hs-Ht| between the Vickers hardness Hs of the peripheral edge portion of the emboss and the Vickers hardness Ht of the apex portion of the emboss is within 10.

4. The spot welding method for superimposing and spot-welding aluminum materials together according to claim 2, wherein a difference |Hs-Ht| between the Vickers hardness Hs of the peripheral edge portion of the emboss and the Vickers hardness Ht of the apex portion of the emboss is within 10.

5. The spot welding method for superimposing and spot-welding aluminum materials together according to claim 1, wherein an R-type or DR-type electrode having a curved end face is used as each of the pair of electrodes.

6. The spot welding method for superimposing and spot-welding aluminum materials together according to claim 1, wherein an F-type electrode having a flat end face is used as each of the pair of electrodes.

7. The spot welding method for superimposing and spot-welding aluminum materials together according to claim 1, further comprising applying an adhesive to at least one of the welding-intended positions on the facing surfaces of the first and second aluminum materials, before the placing.

8. The spot welding method for aluminum materials according to claim 5, further comprising applying an adhesive to at least one of the welding-intended positions on the facing surfaces of the first and second aluminum materials, before the placing.

9. The spot welding method for aluminum materials according to claim 6, further comprising applying an adhesive to at least one of the welding-intended positions on the facing surfaces of the first and second aluminum materials, before the placing.

10. The spot welding method for superimposing and spot-welding aluminum materials together according to claim 7, wherein after the pinching and pressurizing, the adhesive is not located in a gap between the first and second aluminum materials.

11. The spot welding method for superimposing and spot-welding aluminum materials together according to claim 8, wherein after the pinching and pressurizing, the adhesive is not located in a gap between the first and second aluminum materials.

12. The spot welding method for superimposing and spot-welding aluminum materials together according to claim 9, wherein after the pinching and pressurizing, the adhesive is not located in a gap between the first and second aluminum materials.

13. The spot welding method for superimposing and spot-welding aluminum materials together according to claim 1, wherein molten aluminum generated by the energization does not flow beyond the peripheral edge portion of the emboss, and a gap G at a central region of the emboss is filled with the molten aluminum.

\* \* \* \* \*